(12) United States Patent
Dhanuka et al.

(10) Patent No.: US 11,900,510 B2
(45) Date of Patent: Feb. 13, 2024

(54) GLYPH SIZE CONTROL FOR DIGITAL CONTENT

(71) Applicant: Adobe Inc., San Jose, CA (US)

(72) Inventors: Praveen Kumar Dhanuka, Howrah (IN); Arushi Jain, Ashok Vihar (IN); Neeraj Nandkeolyar, Ghaziabad (IN); Shivi Pal, Noida (IN)

(73) Assignee: Adobe Inc., San Jose, CA (US)

( * ) Notice: Subject to any disclaimer, the term of this patent is extended or adjusted under 35 U.S.C. 154(b) by 162 days.

(21) Appl. No.: 17/232,706

(22) Filed: Apr. 16, 2021

(65) Prior Publication Data
US 2022/0335667 A1 Oct. 20, 2022

(51) Int. Cl.
*G06F 40/109* (2020.01)
*G06T 11/20* (2006.01)
*G06F 3/04842* (2022.01)
*G06F 3/04845* (2022.01)
*G06K 15/00* (2006.01)

(52) U.S. Cl.
CPC ........ *G06T 11/203* (2013.01); *G06F 3/04842* (2013.01); *G06F 3/04845* (2013.01); *G06F 40/109* (2020.01); *G06K 15/00* (2013.01)

(58) Field of Classification Search
CPC .. G06T 11/203; G06F 40/109; G06F 3/04842; G06F 3/04845; G06K 15/00
See application file for complete search history.

(56) References Cited

U.S. PATENT DOCUMENTS

| | | | |
|---|---|---|---|
| 8,633,930 B2* | 1/2014 | Mansfield | G06T 11/60 345/472.3 |
| 9,620,086 B1* | 4/2017 | Joshi | G09G 5/28 |
| 10,922,863 B2* | 2/2021 | Dhanuka | G06T 11/001 |
| 10,983,679 B2* | 4/2021 | Donahue | G06N 20/00 |
| 2013/0127703 A1* | 5/2013 | Wendt | G06F 40/103 345/156 |
| 2015/0347356 A1* | 12/2015 | Beaver | G09G 5/26 345/472 |

(Continued)

OTHER PUBLICATIONS

"Aligning type with other elements on the page", Schriftkontor Ralf Herrmann, Typography.Guru Forum [online][retrieved May 5, 2021]. Retrieved from the Internet <https://typography.guru/forums/topic/3297-aligning-type-with-other-elements-on-the-page/>., Oct. 13, 2019, 8 pages.

(Continued)

*Primary Examiner* — Mahelet Shiberou
(74) *Attorney, Agent, or Firm* — FIG. 1 Patents

(57) ABSTRACT

Glyph sizing control techniques are described for digital content that provide insight regrading a true size of glyphs when rendered using a respective font and also leverages this insight to control font sizing and alignment. In one example, a glyph sizing system outputs a plurality of options to specify a unit-of-measure to control an actual size of a glyph as rendered in a user interface. Examples of units of measure include a capital height, x-height, ICF-height, dynamic height, object height, width, and other spans along a dimension, e.g., based on ascent, descent, or other. These units of measure are leveraged by the glyph sizing system to surface information regarding an actual size of respective glyphs for that unit-of-measure and control glyph sizing and arrangement.

20 Claims, 12 Drawing Sheets

(56) References Cited

U.S. PATENT DOCUMENTS

2018/0300294 A1* 10/2018 Dhanuka ............... G06F 40/109

OTHER PUBLICATIONS

"How can we improve Illustrator (desktop)? Vote or share a new idea.—Character Height", Adobe Illustrator Forum [online][retrieved May 5, 2021]. Retrieved from the Internet <https://illustrator.uservoice.com/forums/333657-illustrator-feature-requests/suggestions/37422766-character-height>., Apr. 19, 2019, 2 pages.

Mattheus, Ben et al., "How can we improve Illustrator (desktop)? Vote or share a new idea.—correction to the Real Size measurements of used FONTS in the size box", Adobe Illustrator Forum [online][retrieved May 5, 2021]. Retrieved from the Internet <https://illustrator.uservoice.com/forums/333657-illustrator-feature-requests/suggestions/31531300-correction-to-the-real-size-measurements-of-used-f>., 2017, 5 pages.

* cited by examiner

GLYPH SIZE CONTROL FOR DIGITAL CONTENT

BACKGROUND

Digital content processing systems offer thousands of different fonts for use in digital content creation and editing. A font refers to a particular size, weight, and style of typeface used to represent respective glyphs (e.g., text characters), whereas a typeface includes a range of fonts that share an overall design. The variety of fonts enable content creators that interact with the systems to have the freedom to choose from a multitude of options to represent characters of text and other glyphs in digital content, e.g., for rendering in a user interface, as part of reproduction on a physical medium, and so forth.

The freedom and multitude of font options, however, introduces a variety of challenges as implemented by conventional digital content processing systems. Each glyph of a font is defined within a respective em-box. This follows from a manual printing convention in which metal type used to physically press a glyph to paper is defined based on a line height, e.g., as a number of points. Therefore, a font size is based on a height of the em-box and a width (which may vary) to define spacing between glyphs along a same line. Thus, each font size uses a same number of points for the height of the em-box. Line spacing is defined based on font size, e.g., 1.2 times the font size. Thus, font size determines a size of an em-box which in turn determines a line height.

However, consumption of space within respective em-boxes by glyphs may vary for different fonts. For example, glyphs are definable using different baselines, heights, ascenders, descenders, left/right offsets, and locations within respective em-boxes for different fonts. Therefore, a glyph can have different heights and/or widths within respective em-boxes when rendered using different fonts, different locations within the respective boxes (e.g., through use of different baselines and/or left and right spacing), and so forth.

Consequently, conventional digital content processing systems that use font sizing, solely, encounter challenges with determining a true size and location of glyphs rendered by the font, alignment of glyphs rendered by the font with other glyphs or objects, and so on. As a result, conventional techniques are inefficient both with respect to user interaction involving a lack in accuracy resulting from manually guessing a size and alignment of glyphs rendered using different fonts as well as inefficient consumption in computation resources to support this manual interaction.

SUMMARY

Glyph sizing control techniques are described for digital content that provide insight regrading a true size of glyphs when rendered using a respective font and also leverages this insight to control glyph sizing and alignment. In one example, a glyph sizing system outputs a plurality of options to specify a unit-of-measure to control an actual size of a glyph as rendered in a user interface. The user interface, for instance, includes an option to select a font having a respective font size, e.g., as a number of points.

For that font size, different units of measure are output with indications of corresponding sizes of glyphs for the respective unit-of-measure. Examples of units of measure include a capital height, x-height, ICF-height, dynamic height, object height, width, and other spans along a dimension, e.g., based on ascent, descent, or other. These units of measure are leveraged by the glyph sizing system to surface information regarding an actual size of respective glyphs for that unit-of-measure and control glyph sizing and arrangement.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
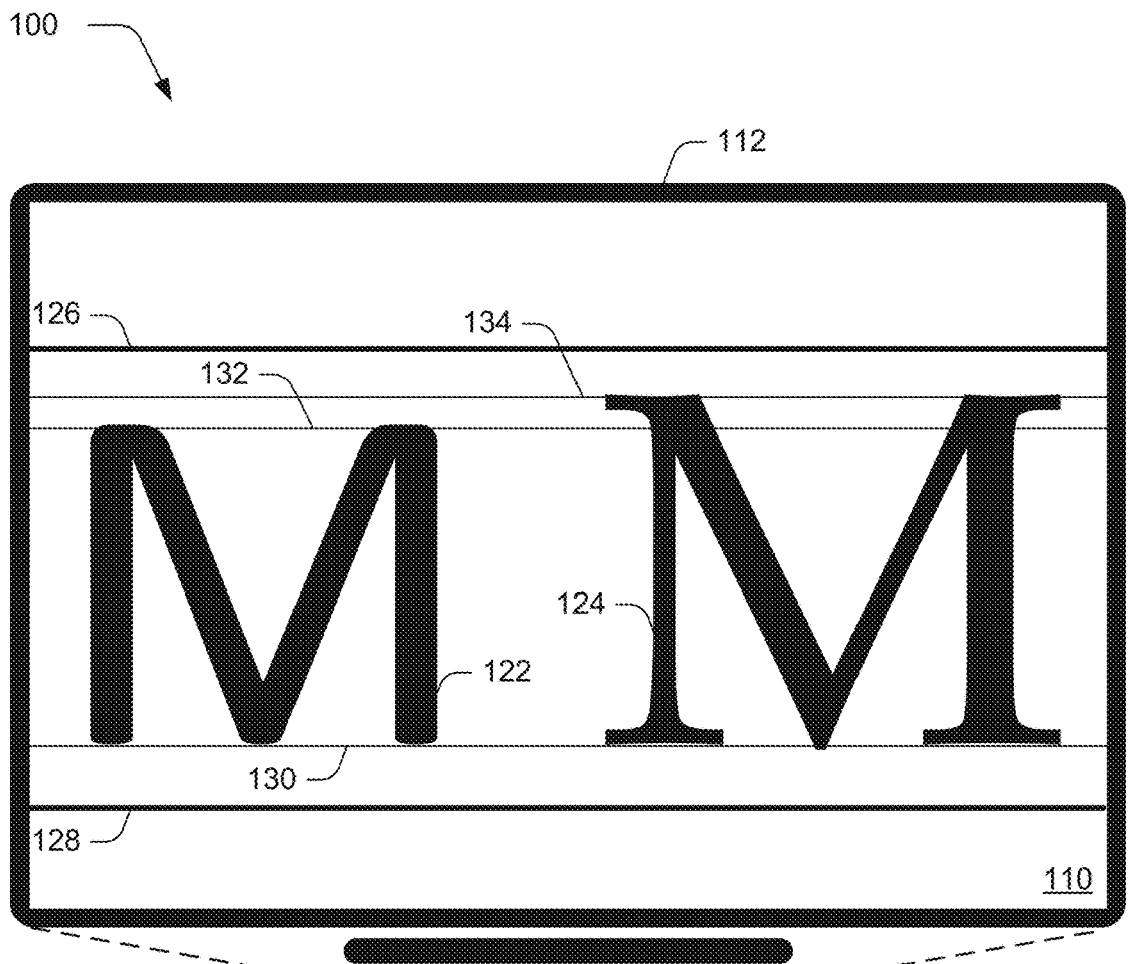
FIG. 1 is an illustration of a digital medium environment in an example implementation that is operable to employ glyph size control techniques described herein.
Figure 1:
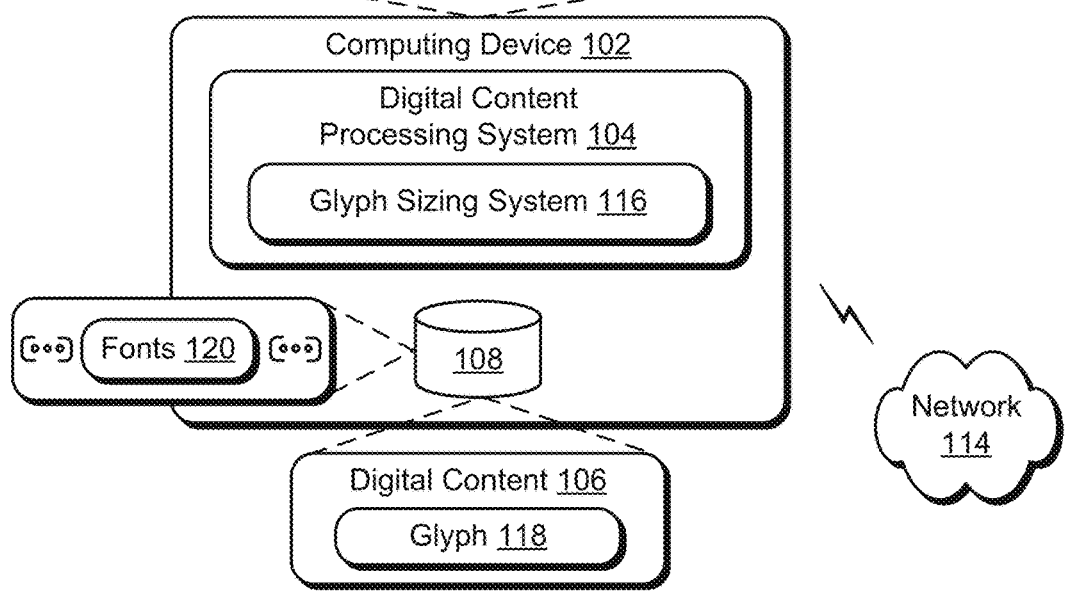

Fonts provide a wide range of ways of representing glyphs in digital content. Font designers, for instance, are free to design glyphs as desired within an em-box. The em-box has a height (e.g., as a number of points) and a width defined by the designer for spacing between inline glyphs. This follows conventions dating back to use of metal dies to physically print text on paper using a printing press. As a result, font designers have a variety of options regarding where to place glyphs within the em-box (both vertically and horizontally), size of the glyphs within the em-box, width and/or height of the em-box itself, and so forth.

It is this freedom, however, that introduces challenges as part of creating and editing digital content. For example, font sizing (e.g., as a number of points) does not have a direct correlation to a real size of a glyph that is to be rendered within an em-box defined by a point size of the font. Further, the position of the glyph within the em-box also varies horizontally and vertically for different types of fonts, e.g., through use of different baselines and left/right bearing. Conventional techniques, however, did not surface information regarding the actual size and placement of glyphs. The lack of this information forces a content creator to make a "best guess" as to this size, which is typically inaccurate and results in repeated operations involving resizing glyphs. This also results in inefficient use of computational resources used by systems that implement these conventional techniques.

Accordingly, glyph sizing control techniques are described for digital content that provide insight regrading a true size of glyphs when rendered using a respective font and also leverages this insight to control glyph sizing. In this way, systems that implement these techniques have increased accuracy over conventional "best guess" solutions and improve accuracy and computational efficiency of computing devices that implement these techniques.

In an example, a glyph sizing system outputs a user interface having a plurality of options to specify a unit-of-measure to control an actual size of a glyph as rendered in a user interface. The user interface, for instance, includes an option to select a font having a respective font size, e.g., as a number of points. For that font and font size, different units of measure are output with indications of corresponding sizes of glyphs for the respective unit-of-measure. Examples of units of measure include a capital height, x-height, ICF-height, dynamic (real time) height, object height, width, and other spans, e.g., based on ascent, descent, or other.

A capital height is defined between a baseline of a glyph within an em-box and a height of a capitalized glyph, e.g., an upper-case letter such as an "M." An x-height is defined between the baseline of the glyph within an em-box and a height of a glyph that is not capitalized, e.g., a lower-case letter such as an "x." An ICF-height is a unit-of-measure based on an ideographic character space (ICF), e.g., between ideographic top and bottom lines within an em-box. Dynamic height refers to an overall height of glyphs to be rendered in a user interface and thus changes based on the sizes of the glyphs selected for output. Width defines horizontal width of the glyph within the em-box without excess padding (e.g., left/right bearing or offset) used to define spacing between glyphs along a line in the digital content. Other examples include use of ascenders, descenders, and so on to define size and positioning of the glyph within the em-box. Thus, each of these examples is usable to provide accurate insight into the true and actual dimensions of the glyphs by a glyph sizing system, which overcomes the limitations of conventional "best guess" scenarios.

Further, these units of measure are also leveraged by the glyph sizing system to provide automated glyph sizing control. The options above, for instance, are user selectable to specify a desired unit-of-measure. The selected unit-of-measure is then used to control sizing of glyphs rendered in the user interface. In one example, this is used to control size of the glyph defined by the unit-of-measure to coincide with a line height, font size, and so on via the glyph-size property.

User inputs, for instance, are received for text using a font having a first font size, e.g., 62 points. Selection of a "capital height" option causes the text to be resized by the glyph sizing system such that capitalized glyphs for the font have a height that matches this font size.

To do so, the glyph sizing system 116 determines a capital height of a glyph (e.g., a capitalized letter) for the first line height. A bounding box is formed by the glyph sizing system that defines actual dimensions of the glyph within the em-box, e.g., based on minimum and maximum coordinates in X and Y directions of pixels of the glyph when rendered virtually from a corresponding vector representation. A lower edge of the bounding box defines a baseline and an upper edge of the bounding box defines a capital line. Therefore, the capital height is defined for a vertical dimension as a span between the baseline and the capital line of the bounding box. Continuing the example above, for a first font size of 62 points for the font, a capital height is determined as a glyph size of 47.5 points. A quotient is then calculated by the glyph sizing system, automatically and without user intervention, by dividing the first font size (e.g., 62 points) by the glyph size (e.g., 47.5 points) to determine a font-size adjustment, e.g., 1.31.

The font-size adjustment is then used by the glyph sizing system to determine a second font size for the glyph in the font to cause the glyph to have a height that matches the first font size, which is 92 points in this example. This is the used to resize the glyph to have the first font size from fonts rendered using the second font size. As a result, capitalized glyphs of the font, when rendered in the user interface, have an actual height that matches the first font size. Similar techniques are also implemented by the glyph sizing system for x-height, ICF-height, dynamic (real time) height, object height, width, and other spans, e.g., based on ascent, descent, any other point of reference defined in relation to a glyph and/or within an em-box. In this way, the glyph sizing system supports increased accuracy to address the challenges of differences in actual sizes of glyphs for respective fonts, which is not possible in conventional font sizing techniques. Further discussion of these and other examples is included in the following sections and shown using corresponding figures.

Term Examples

A "glyph" is an elemental symbol within an agreed set of symbols (e.g., a font) to represent a readable character in typography. Examples of glyphs include letters, numbers, and other symbols, e.g., "@."

A "font" defines a particular size, weight, and style of a typeface used to render glyphs. A "font size" defines how large glyphs are displayed within digital content, e.g., as a number of points. "Line height" is based on font size, e.g., 1.2 times the font size. A "point" is the smallest unit-of-measure in typography and used to measure font size, leading, and other items within digital content.

A "capital height" is defined between the baseline of the glyph within an em-box and a height of a glyph that is capitalized, e.g., a upper-case letter such as an "M."

An "x-height" is defined between the baseline of the glyph within an em-box and a height of a glyph that is not capitalized, e.g., a lower-case letter such as an "x."

An "ICF-height" is a unit-of-measure based on an ideographic character space, e.g., between ideographic top and bottom lines within an em-box.

"Dynamic height" refers to an overall height of glyphs to be rendered in a user interface and thus changes based on the sizes of the glyphs selected for output.

"Width" as a unit-of-measure defines horizontal width of the glyph within the em-box without excess padding (e.g., left/right bearing or offset) used to define spacing between glyphs along a line in the digital content.

A "font engine" describes executable functionality to convert information defining a glyph (e.g., a vector representation) into a raster image suitable for display in a user interface, printed to a physical medium, and so forth.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 14.

The computing device 102 is illustrated as including a digital content processing system 104. The digital content processing system 104 is implemented at least partially in hardware of the computing device 102 to process and transform digital content 106, which is illustrated as maintained in a storage device 108 of the computing device 102. Examples of digital content 106 include digital documents, digital images, digital media, and so forth. Such processing includes creation of the digital content 106, modification of the digital content 106, and rendering of the digital content 106 in a user interface 110 for output, e.g., by a display device 112. Digital content 106 is also usable as a basis to render to physical media, e.g., print to paper. Although illustrated as implemented locally at the computing device 102, functionality of the digital content processing system 104 is also configurable as whole or part via functionality available via the network 114, such as part of a web service or "in the cloud."

An example of functionality incorporated by the digital content processing system 104 to create and edit the digital content 106 is illustrated as a glyph sizing system 116. The glyph sizing system 116 is configured to surface information and control actual sizing of glyphs 118 as rendered as part of digital content 106. As described above, a glyph 118 is an elemental symbol within an agreed set of symbols (e.g., a font) to represent a readable character in typography, e.g., "a," "B," "!", and so forth. A "font" 120 defines a particular size, weight, and style of a typeface used to render glyphs and a "font size" is used to define size of glyphs based on line spacing, i.e., line height. A font having a font size of "12 pt," for instance, defines sizing to be used by fonts based on this number of points.

Fonts 120 are defined based on an em-box having the specified number of points. However, font design may vary within the em-box and as a result glyphs have different sizes, locations, and so on for different fonts. In the illustrated user interface 110, for instance, first and second glyphs 122, 124 are output with a font size by spacing between first and second lines 126, 128 for a same character of text, which is a capital "M." The first and second lines 126, 128 define top and bottom edges of respective em-boxes for the glyphs.

However, even though the first and second glyphs 122, 124 share a same baseline 130 and represent the same character, capital heights of the glyphs differ. The capital height is defined as a span in a vertical dimension between the baseline 130 and a capital line defining an upper edge of the respective glyph. In the illustrated example, a capital height defined between the baseline 130 and a capital line 142 for the first glyph 122 is less than a capital height defined between the baseline 130 and a capital line 144 for the second glyph 124. Thus, even though the first and second glyphs 122, 124 share a same character, same font size, and even same baseline 130 in this example, actual size of the glyphs differs, one to another.

Accordingly, the glyph sizing system 116 is configured to determine actual and true size (i.e., real size) of glyphs rendered for respective fonts and leverage this information to aid creation and editing of digital content 106. The glyph sizing system 116, for instance, is configurable to expose information regarding actual sizes of glyphs for a respective font size of a font, e.g., x-height, capital height, and other units of measure. In this way, the glyph sizing system 116 surfaces information usable by a content creator to aid in digital content 106 creation through actual knowledge of glyph size, which is not possible in conventional line-based techniques that relied on a best guess and thus improves content creation accuracy. For example, it is not feasible for a human being to accurately determine a size of glyphs as typically used in digital documents due to the minute scale being used, i.e., it is too difficult to discern with the human eye because the differences are so small.

Further, the glyph sizing system 116 is also configured to resize fonts based on respective units of measure. In one example, the glyph sizing system 116 is configured to resize glyphs to consume a number of points for a respective unit-of-measure. Selection of a "capital height" option, for instance, causes glyphs to be output in a user interface based on capital height of the glyphs, e.g., to match the amount of points defined for a font size. Therefore, capital glyphs when rendered using different fonts have the same span across a vertical dimension (i.e., same height) when the "capital height" option is selected. Other examples are also contemplated, such as x-height, ICF-height, dynamic (real time) height, object height, width, and other spans, e.g., based on ascent, descent, or other. In this way, the glyph sizing system 116 is configured to expose functionality indicative of a "true size" of glyphs rendered using the font and leverages this information to control font sizing in the user interface 110, automatically and without user intervention. Further discussion of these and other techniques is included in the following sections.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Automated Glyph Sizing Determination and Control

Figure 2:
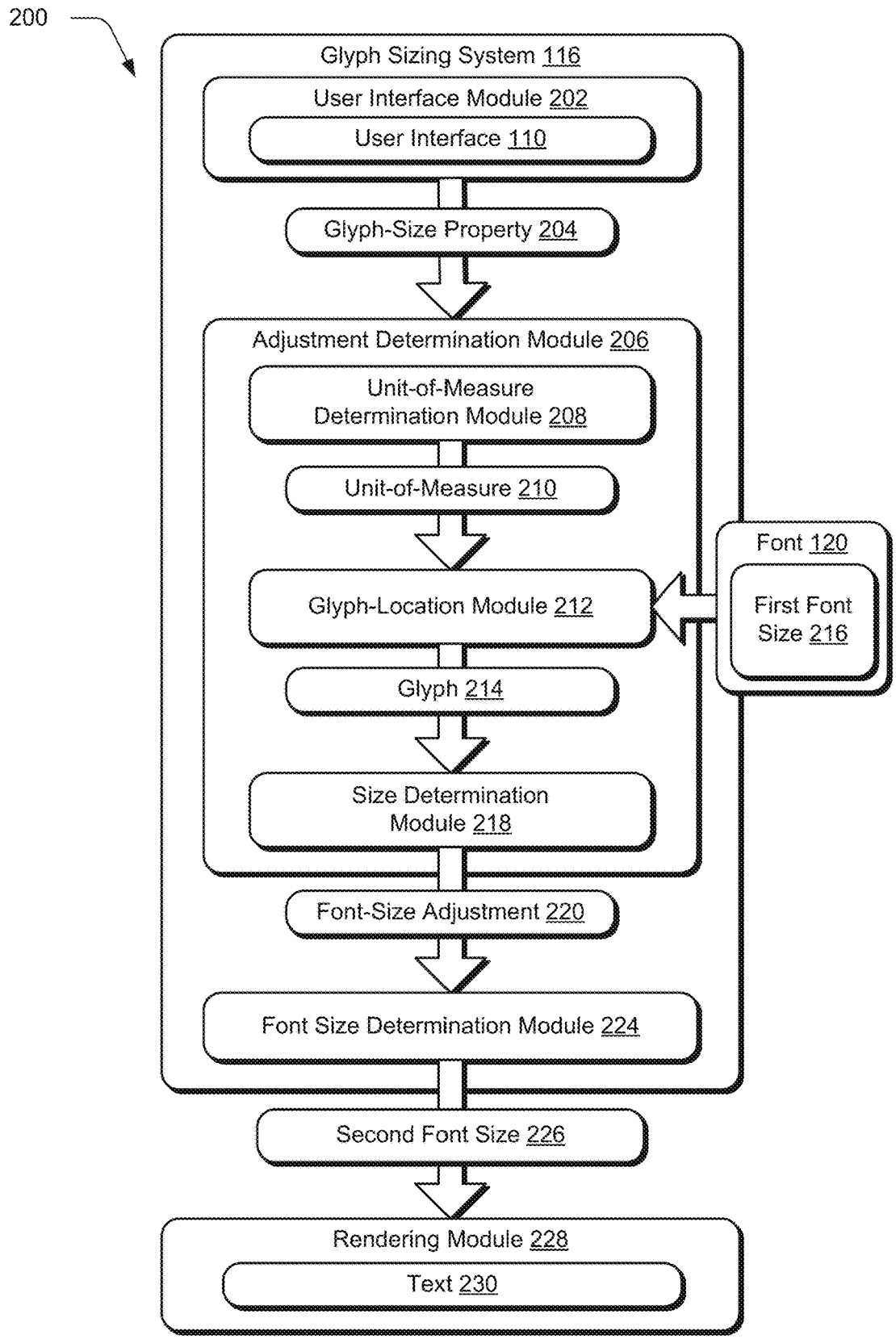
FIG. 2 depicts a system in an example implementation showing operation of a glyph sizing system of FIG. 1 in greater detail.
Figure 3:
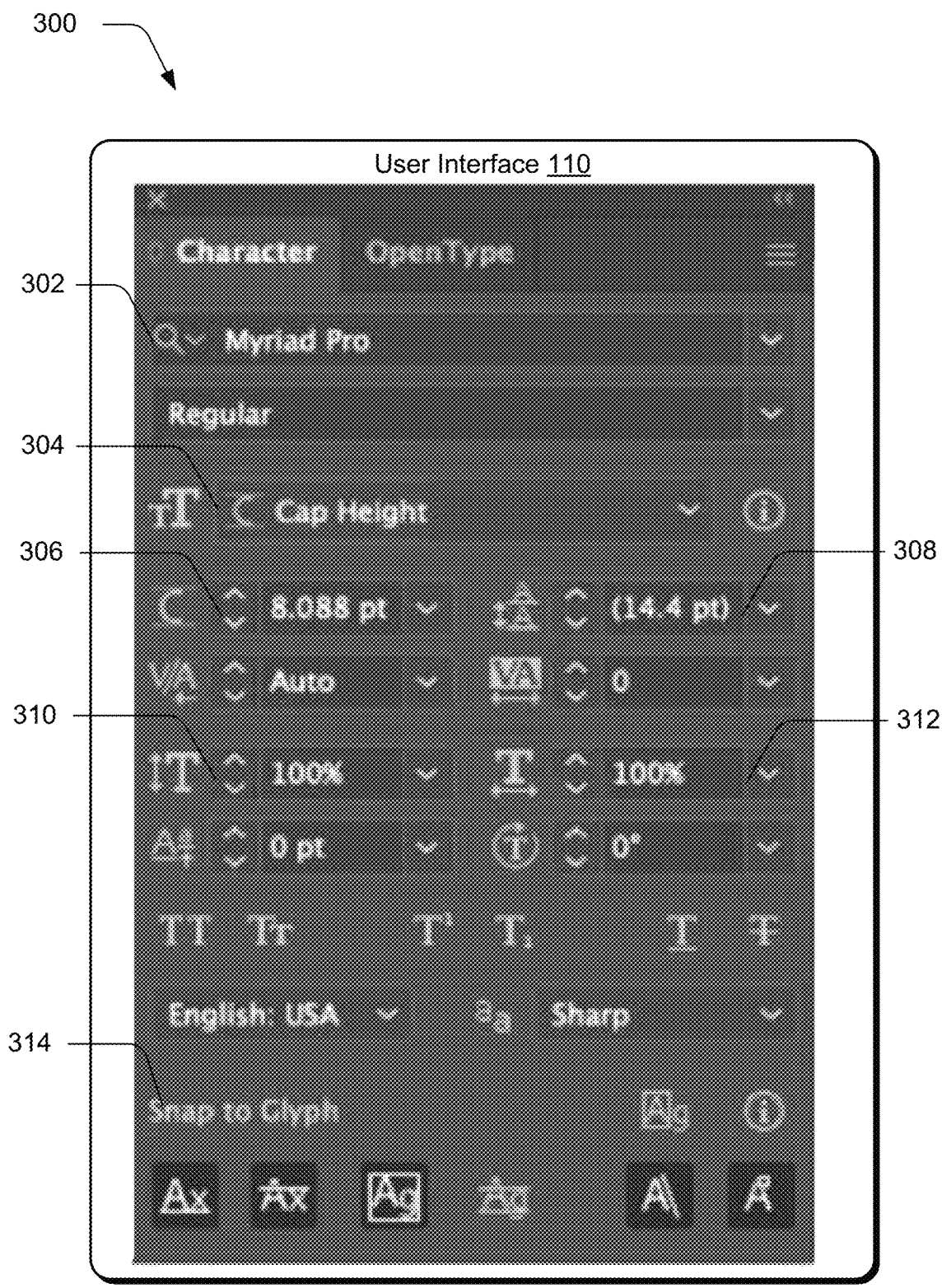
FIG. 3 depicts an example of a user interface including glyph sizing options.
Figure 4:
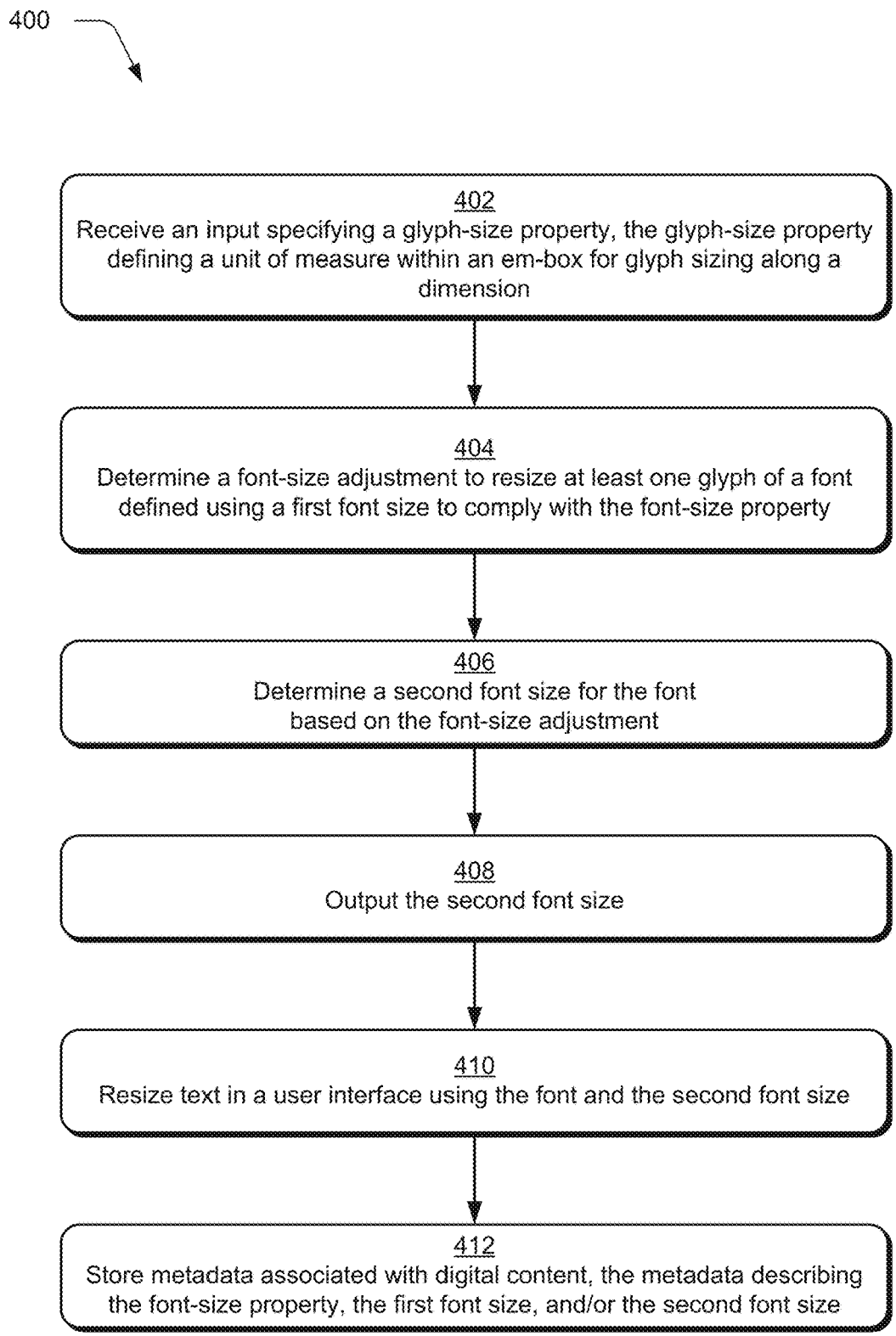
FIG. 4 is a flow diagram depicting a procedure in an example implementation of determining a font-size adjustment to resize a glyph.
Figure 5:
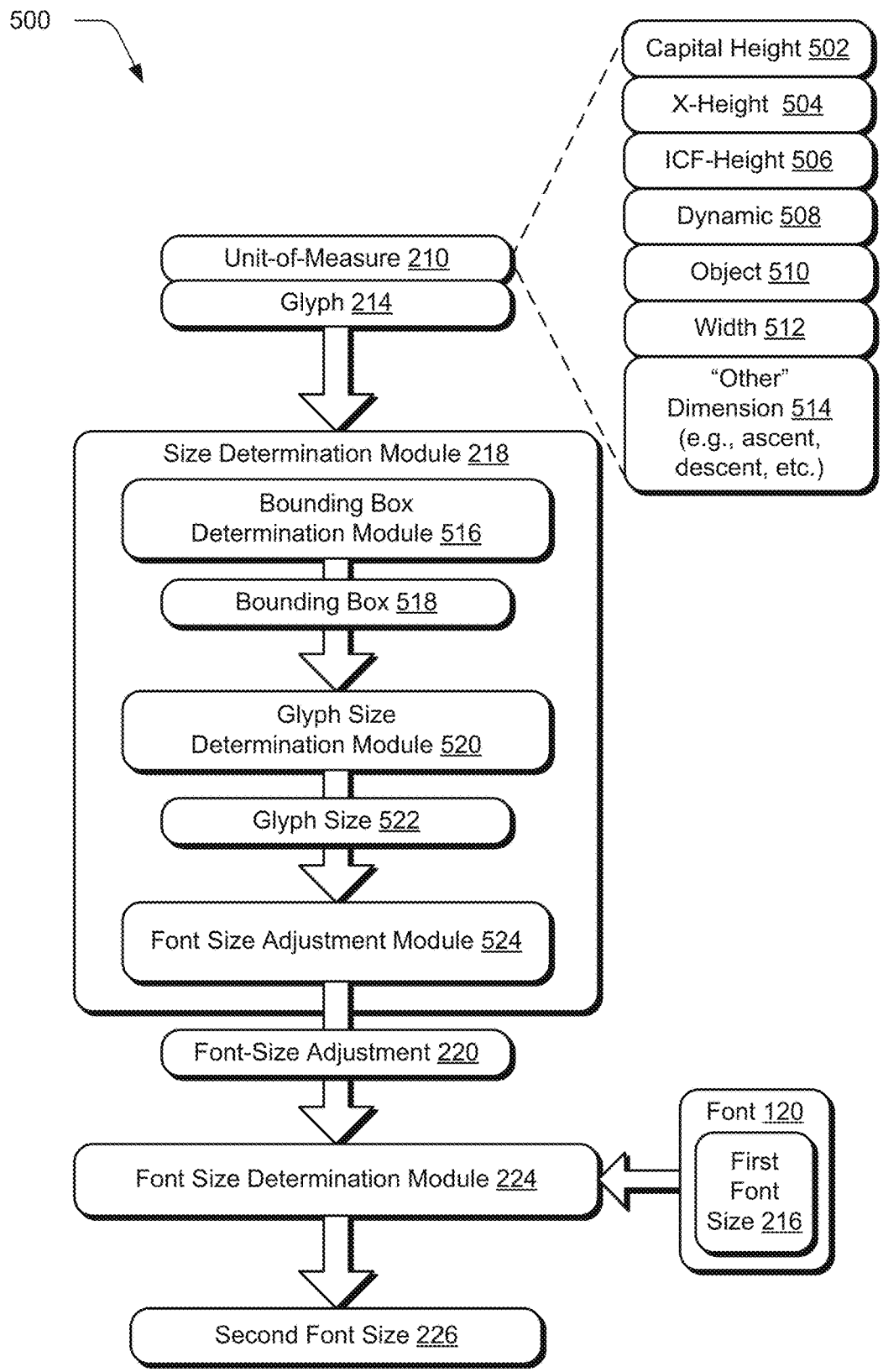
FIG. 5 depicts a system in an example implementation showing operation of a size determination module of FIG. 2 in greater detail.

FIG. 2 depicts a system 200 in an example implementation showing operation of the glyph sizing system 116 of FIG. 1 in greater detail. FIG. 3 depicts an example 300 of a user interface including font sizing options. FIG. 4 depicts a procedure 400 in an example implementation of determining a font-size adjustment to resize a glyph based on a unit-of-measure. FIG. 5 depicts a system 500 in an example implementation showing operation of the size determination module of FIG. 2 in greater detail.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-12.

To begin in this example a user interface module 202 outputs a user interface 110. The user interface 110 includes options to initiate an input to specify a glyph-size property 204. The glyph-size property defines a unit-of-measure within an em-box for glyph sizing along a dimension (block 402). As shown in an example 300 of the user interface 110 in FIG. 3, an option 302 is included to select a particular font, which is "Myriad Pro" in this example. A drop-down menu 304 provides options to select a particular unit-of-measure, which in the illustrated example is "Cap Height" for "capital height." Other options from the drop-down menu 304 include, but are not depicted, as x-height, ICF-height, dynamic (real time) height, object height, width, and other spans, e.g., based on ascent, descent, or other.

The user interface 110 includes a glyph size control 306 that indicates a size of a glyph for the selected unit-of-measure and functionality to change that amount, e.g., as an up/down arrow to change a number of points. This also causes a change to an indicated font size of a font size control 308 and vice versa, e.g., a change via the font size control 308 causes a corresponding change to the glyph size of the glyph size control 306 and so on. In this way, the glyph height for a unit-of-measure is directly controllable through interaction with the user interface 110. Other examples include a height control 310 and width control 312 to specify height and width as a percentage of an overall value as well as an alignment control 314 to specify alignment behaviors to a glyph (as opposed to line height), e.g., to align graphical objects to a baseline, x-height, bounding box, and so on as further described in relation to FIG. 13.

The glyph-size property 204 is then passed as an input to an adjustment determination module 206 to determine a font-size adjustment 220. To do so, a unit-of-measure determination module 208 is first used to determine a unit-of-measure 210 that corresponds to the glyph-size property 204, e.g., capital height, x-height, ICF-height, and so on as described in greater detail below. The unit-of-measure 210 is then passed to a glyph-location module 212 to obtain at least one glyph 214 that corresponds to the unit-of-measure determination module 208, e.g., though use of glyph IDs. The glyph-location module 212, for instance, obtains the glyph 214 of a font 210 corresponding to the unit-of-measure 210 and a first font size 216, e.g., a font and amount currently set by the digital content processing system 104 for text display via the user interface 110 of FIG. 3. For a unit-of-measure 210 of "capital height," for instance, the glyph-location module 212 obtains a glyph 214 (or run of glyphs) from the font 120 that is capitalized.

The glyph 214 is then passed as an input to a size determination module 218 to determine a font-size adjustment 220 usable to resize the at least one glyph 214 of the font 120 to comply with the glyph-size property 204. The font 120 is defined using a first font size 216 (block 404), e.g., as a number of points. The font-size adjustment 220 is usable to determine an adjustment to cause a span of a dimension defined for the glyph 214 (e.g., height defined with respect to a vertical dimension) to coincide with the first font size 216. Other examples are also contemplated, such as to coincide with a user defined amount. As a result, the font-size adjustment 220 is configured to cause the unit-of-measure 210 for the glyph 214 to have this amount as further described in greater detail starting in relation to FIG. 5.

The font-size adjustment 220 is then passed to a font size determination module 224 to determine a second font size 226 for the font 120 based on the font-size adjustment 220 (block 406). The font-size adjustment 220, for instance, defines a proportional difference between a glyph size of the glyph 214 corresponding to the unit-of-measure 210 and the first font size 216. Therefore, in this instance, the font-size adjustment 220, when applied to the first font size 216, defines a second font size 226 usable to cause glyphs corresponding to the unit-of-measure 210 to have that amount, e.g., capital height, x-height, and so forth. In this way, a "real" height of the glyph 214 matches the first font size 216.

The second font size 226 is output (block 408) by the font size determination module 224, which is leveraged in a variety of ways. In one example, a rendering module 228 resizes text 230 in the user interface 110 using the font 120 and the second font size 226 (block 410). In a further example, metadata associated with the digital content 106 is stored, the metadata describing the glyph-size property and the second font size (block 412), e.g., as part of a cascading style sheet (CSS) as a property known as "font size reference." In this way, the adjustment persists along with the digital content 106, e.g., by storing an "old" font size with respect to each new font size referent in order to preserve fidelity between applications that do not support the font size reference.

FIG. 5 depicts a system 500 showing operation of the size determination module 218 as generating the font-size adjustment 220 in greater detail. The size determination module 218 receives as an input the unit-of-measure 210 and the glyph 214 corresponding to the glyph-size property 204. A variety of units of measure are leveraged to control sizing of the glyph 214, examples of which include capital height 502, x-height 504, ICF-height 506, dynamic 508, object 510, width 512, and "other" dimension 514 such as ascent, descent, and so forth. The glyph 214 is obtained in this example for a corresponding unit-of-measure 210 based on glyph ID.

Figure 6:
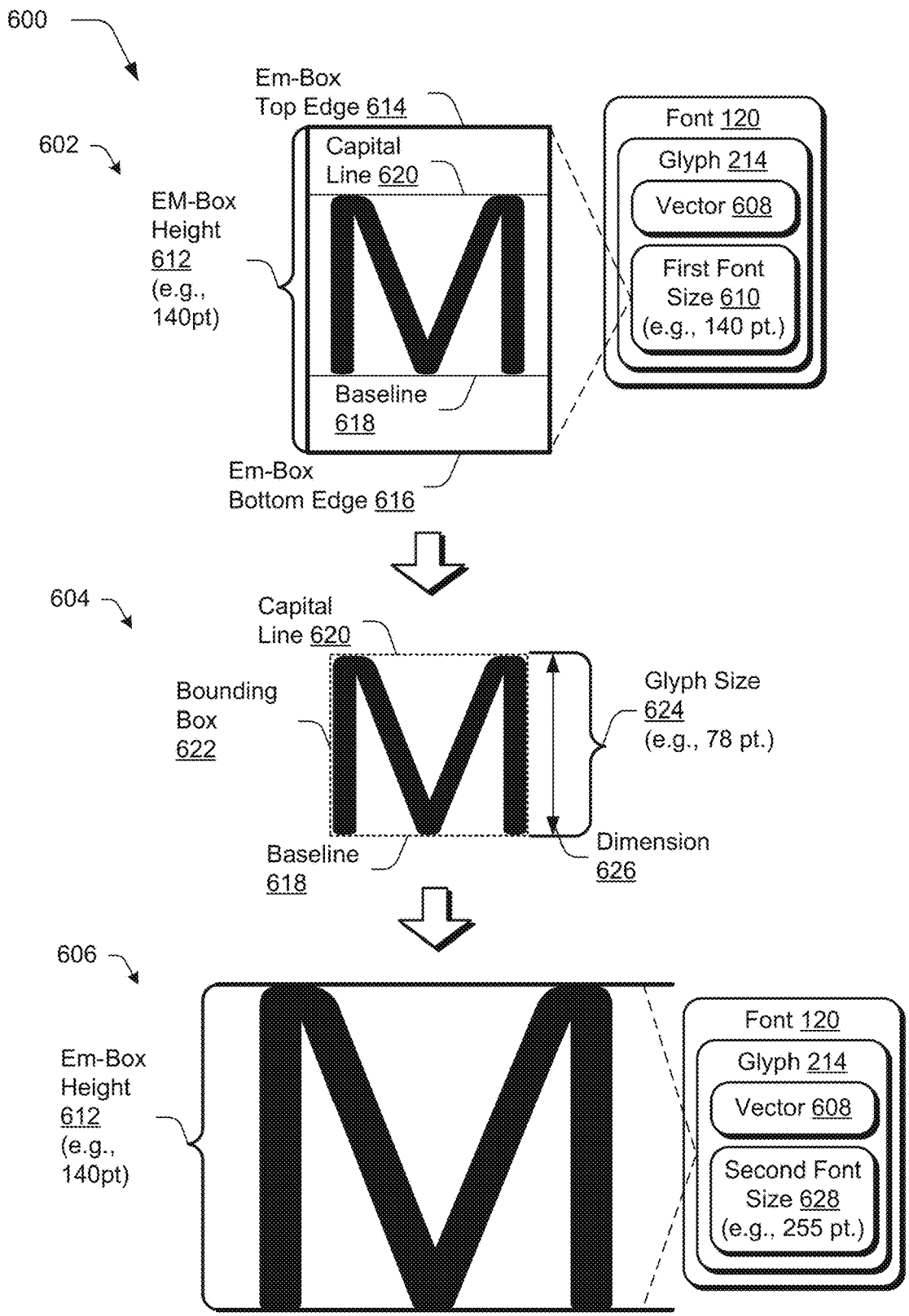
FIG. 6 depicts an example implementation of font-size adjustment for a font-size property specified as capital height.
Figure 7:
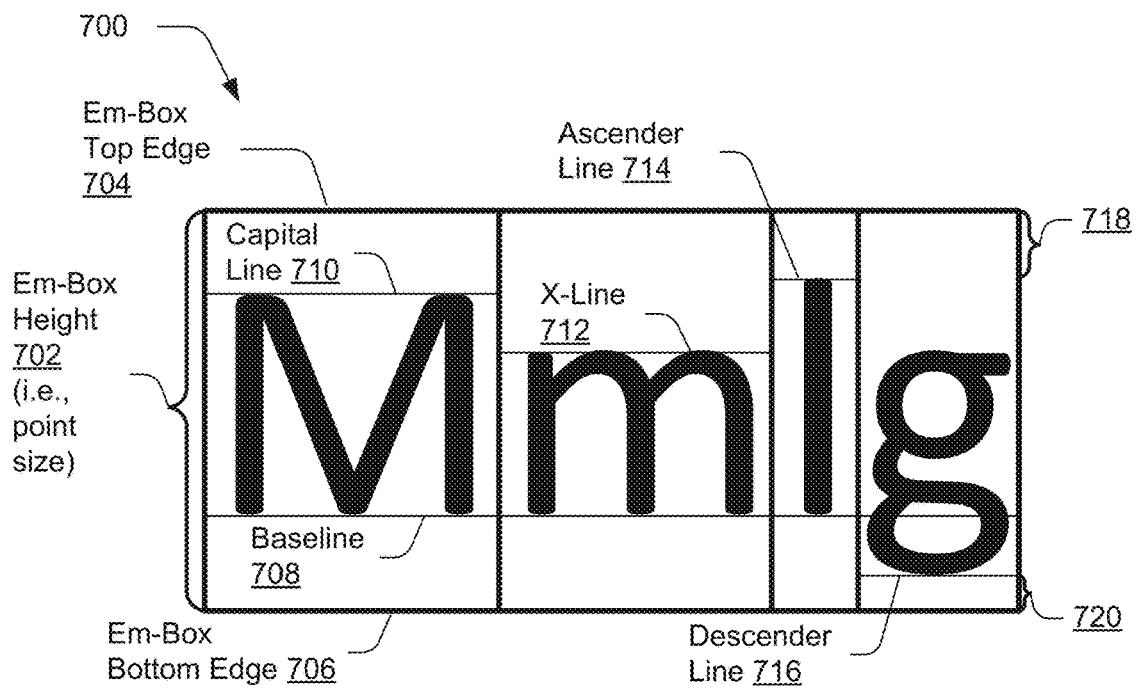
FIG. 7 depicts examples of spans for dimensions of glyphs that are usable to define a unit-of-measure.

A bounding box determination module 516 is utilized to generate a bounding box 518 defining the outer edges of the glyph 214. FIG. 6 depicts an example implementation 600 of glyph-size determination using a bounding box for a glyph-size property specified as capital height 502. This implementation 600 is depicted using first, second, and third stages 602, 604, 606.

At the first stage 602, a glyph 214 is depicted as rendered virtually from a corresponding vector 608 at a first font size 610, e.g., 140 pt. Accordingly, the em-box height 612 is also 140 pt. and defines an em-box top edge 614 and an em-box bottom edge 616.

At the second stage 604, a bounding box 622 is determined by examination of the mathematical representation of the vector 608, e.g., to determine maximum and minimum coordinates in a y-dimension for pixels of the glyph in this example that define a baseline 816 and capital line 620 through use of a font engine. Similar techniques are usable to determine maximum and minimum coordinates for the x-dimension.

The bounding box 518 is then passed as an input to a glyph size determination module 520 that is representative of functionality to determine a glyph size 522 for the glyph 214 having the unit-of-measure 210. To do so, the glyph size determination module 520 determine a span along a dimension corresponding to the glyph-size property 204. In the example of FIG. 6, the dimension 626 is "height" along a y-dimension. Therefore, the glyph size 624 (for capital height 502 in this example) is a span of the glyph 214 defined by the bounding box 622 along this dimension 626 between the baseline 618 and capital line 620.

The glyph size 522 is then passed to a font size adjustment module 524 to determine the font-size adjustment 220. Continuing with the previous example, "f" represents a font size (i.e., the first font size 216) and "$h_i$" represents the glyph size 522 determined as a height of the bounding box 622, e.g., a span along a vertical dimension between the baseline 618 and the capital line 620. Therefore, a font-size adjustment 220 "$s_i$" is generated as a quotient of the first font size 216 divided by the glyph size 522, e.g., "140 pt." for the first font size 610 for "f" divided by the glyph size 624 of "78 pt." for "$h_i$" to obtain a font-size adjustment 220 for "$s_i$" of "1.79." In an implementation, the glyph size determination module 520 is determined for a "run" (i.e., plurality) of glyphs from the font 120 that share the unit-of-measure 210, e.g., for a plurality of capitalized glyphs, lower case glyphs, etc.

The font-size adjustment 220 is then passed as an input from the size determination module 218 to the font size determination module 224. From this, the font size determination module 224 determines a second font size 226 as a product of the first font size 216 and the font-size adjustment 220, e.g., font-size adjustment 220 of "1.79." multiplied by the first font size 610 of "140 pt" to calculate the second font size 226 as "225 pt." Thus, as illustrated for the third stage 606 of FIG. 6, capitalized glyph 214 of the font 120 having the second font size 628 of "255 pt" results in a capital height 502 that matches an em-box height 612 of the first font size 610, e.g., "140 pt." Other examples are contemplated in which the unit-of-measure (e.g., capital height) is defined in other ways, such as via a user input as described in relation to FIG. 3.

Similar techniques are also usable for a variety of other units of measure. As shown in an example implementation 700 of FIG. 7, for instance, dimensions of glyphs are definable in relation to a variety of glyph characteristics to define a unit-of-measure. This example, as before, has an em-box height 702 which defines an em-box top edge 704 and an em-box bottom edge 706. Capital height 502 defines a unit-of-measure between a baseline 708 and a capital line 710 corresponding to a maximum height along a y-dimension for capitalized glyphs of a font. X-height 504 defines a unit-of-measure between the baseline 708 and an x-line 712 corresponding to a maximum height along a y-dimension for lower-case glyphs of a font. As illustrated, however, some lower-case glyphs include ascenders defined using a respective ascender line 714 (e.g., for a lower case "1") and/or descender defining line 716 (e.g., for a lower case "g" as illustrated) which may also be used to define a unit-of-measure. Bearing 718, 720 (also referred to as "padding" or a "gutter") is also typically included within the em-box to define location of the glyph within the em-box in vertical and/or horizontal dimensions.

Figure 8:
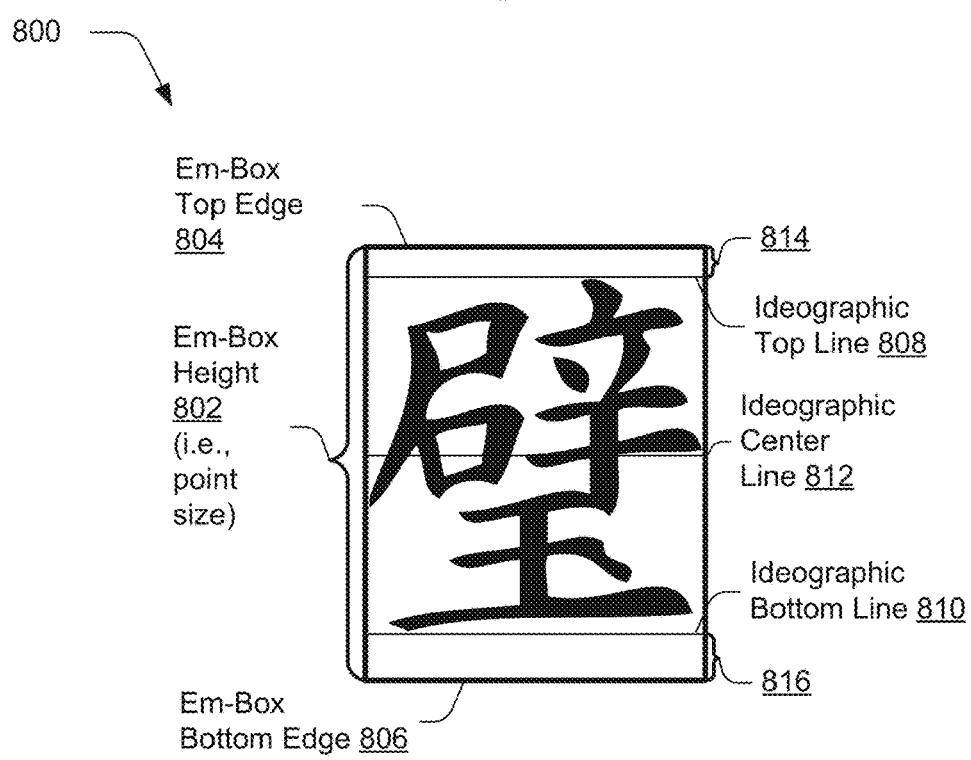
FIG. 8 depicts an additional example of a unit-of-measure for ICF-height.

An example 800 of an ICF-height 506 is depicted in FIG. 8. An ideographic character space is typically defined for glyphs that are not alphanumeric. Like the previous example, fonts using an ideographic character space are defined using line spacing 802 and as such utilize an em-box having a top edge 804 and a bottom edge 806. An ideographic top line 808 is defined based on a maximum coordinate of the glyph and an ideographic bottom line 810 is defined based on a minimum coordinate of the glyph, e.g., a baseline. Therefore, the ICF-height 506 is a span along a vertical dimension between the ideographic top line 808 and the ideographic bottom line 810. An ideographic center line 812 is also usable to define a unit-of-measure. As illustrated, ideographic glyphs also typically include bearing 814, 816 to define placement of the glyph within the em-box.

Figure 9:
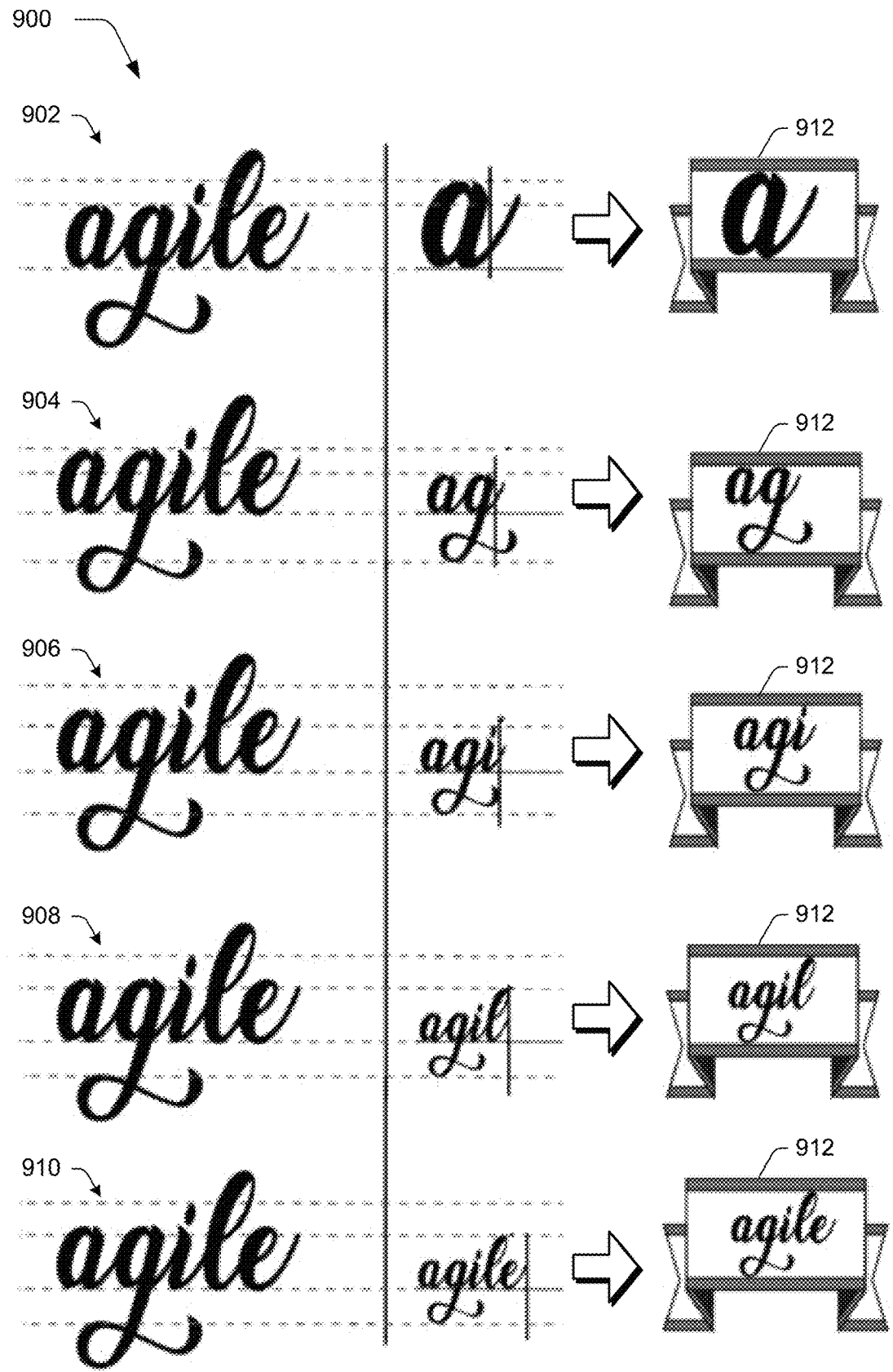
FIG. 9 depicts an example implementation of a unit-of-measure that is dynamic based on glyphs to be rendered in a user interface.

FIG. 9 depicts an example implementation 900 of a unit-of-measure that is dynamic 508 based on glyphs to be rendered in the user interface 110. This example implementation is depicted using first, second, third, fourth, and fifth stages 902, 904, 906, 908, 910. In some instances, content creators have a predefined area within which to place text and wish to maximize a size of the text within that area, such as a banner 912. Therefore, in this instance a unit-of-measure of dynamic 508 is implemented by the size determination module 218 to automatically adjust size of glyphs to maximize size of the glyphs using the techniques described in relation to FIG. 5 but in this instance are based on which glyphs are to be rendered in the user interface 110, e.g., in real time as the text is entered by a user.

In the illustrated example, a height of "40 pt." is set for the banner 912. At the first stage 902 a lower-case letter "a" is entered and the size determination module 218 determine a font size of "54 pt." results in a glyph height of "40 pt." for the letter. At the second stage 904, a lower-case letter "g" is entered, which has a descender. In response, the size determination module 218 determines a font size of "24 pt." results in a height of "40 pt." At the third stage 906, a lower-case letter "i" is entered, which has an ascender. In response, the size determination module 218 determines a font size of "22 pt." results in a height of "40 pt."

At the four stage 906, a lower-case letter "1" is entered, which also has an ascender but which is "taller" than the ascender for the letter "i." In response, the size determination module 218 determines a font size of "18 pt." results in a height of "40 pt." Finally, at the fifth stage 910, a lower-case letter "e" is entered, which does not cause a change and thus the size determination module 218 keeps a font size of "18 pt." In this way, the size determination module 218 automatically adjusts font size internally in real time as the text is entered.

Figure 10:
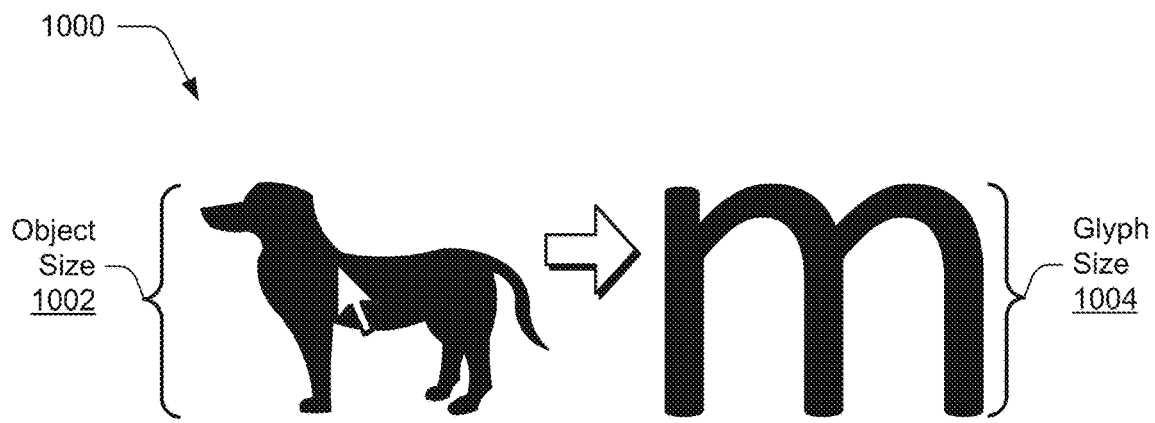
FIGS. 10 and 11 depict example implementations in which size of an object specifies a unit-of-measure for glyph sizing.
Figure 11:
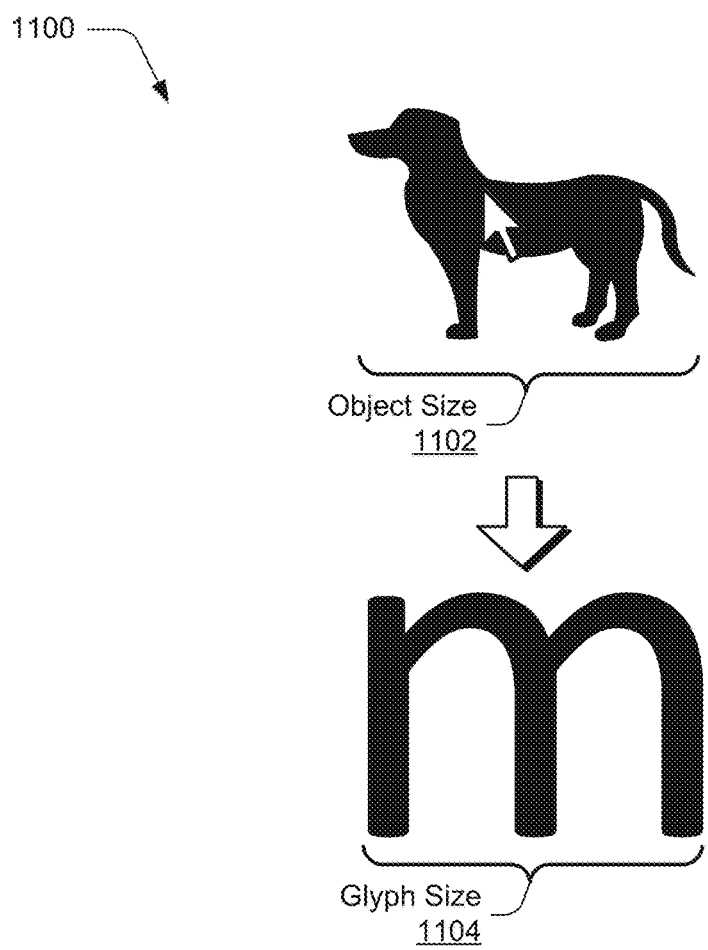

FIGS. 10 and 11 depict example implementations 1000, 1100 in which size of an object 510 specifies a unit-of-measure for glyph sizing In this example, the glyph-size property 204 specifies an object that is to be used as a basis to size a glyph along with a unit-of-measure for a glyph that is to be used in relation to the object. A user input, for instance, selects an object in a user interface 110. An object size 1002 (e.g., height for FIG. 10) is used to set an x-height for a glyph size 1004. Thus, the object size 1002 in this example sets the first font size 216 of FIG. 5 for controlling the size of the glyph. In FIG. 11, a similar technique is used for width 512 in which the object size 1102 as width (e.g., a span along a horizontal dimension) is used to set the glyph size 1102 to a corresponding width.

Figure 12:
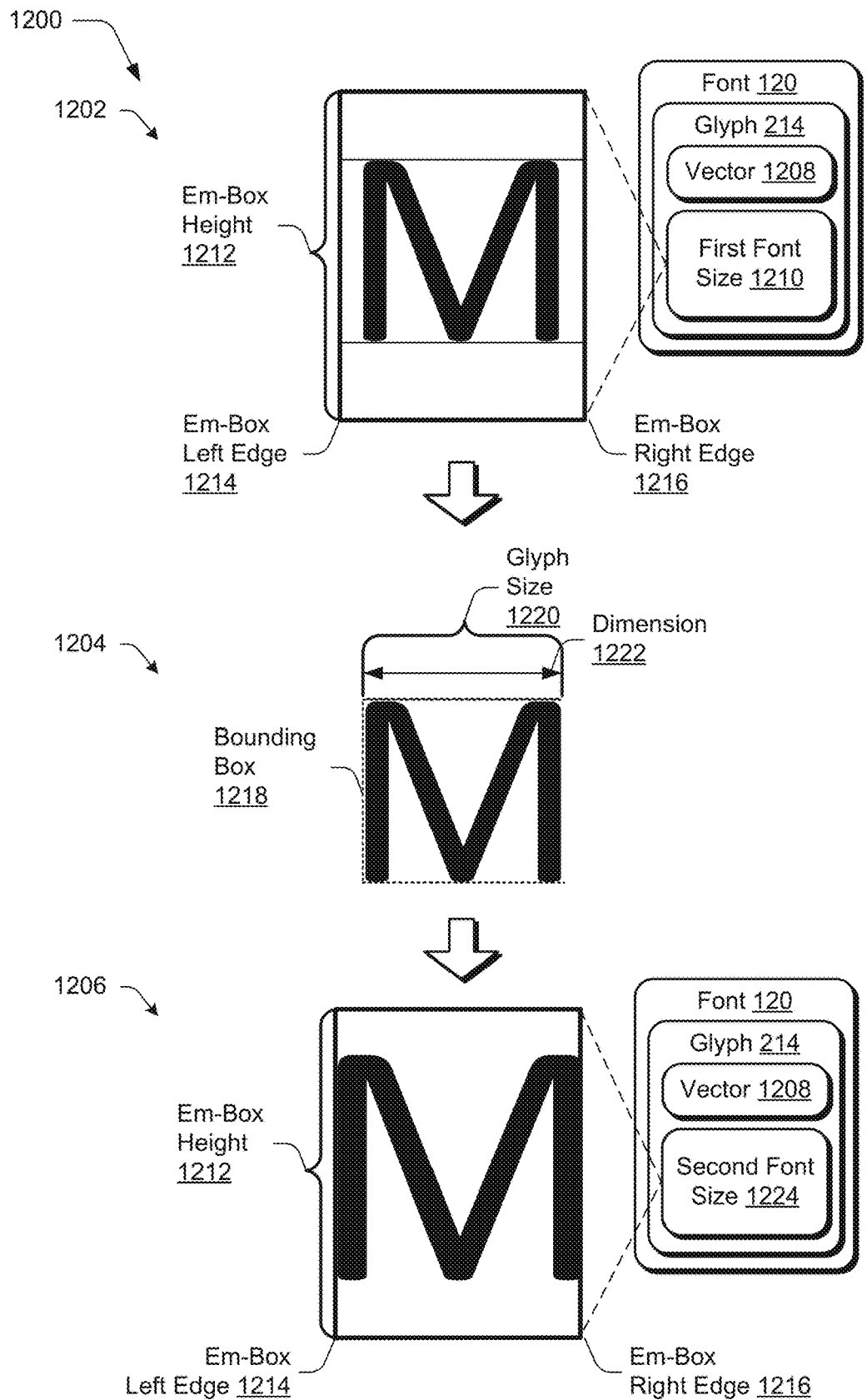
FIG. 12 depicts an example implementation of font-size adjustment for a unit-of-measure specified as width.

FIG. 12 depicts an example implementation 1200 of font-size adjustment for a unit-of-measure specified as width 512. This implementation 1200 is depicted using first, second, and third stages 1202, 1204, 1206. At the first stage 1202, a glyph 214 is depicted as rendered from a corresponding vector 1208 at a first font size 1210, e.g., "140 pt." Accordingly, the line spacing 1212 is also "140 pt." and defines an em-box having an em-box left edge 1214 and an em-box right edge 1216.

At the second stage 1204, a bounding box 1218 is generated through examination of the mathematical representation of the vector 1208, e.g., to determine maximum and minimum coordinates in an x-dimension for pixels of the glyph 214 in this example. Similar techniques are usable to determine maximum and minimum coordinates for the y-dimension. In the example of FIG. 12, the dimension 626 is "width" along an x-dimension as corresponding to width. Therefore, the glyph size 1220 (for width 512 in this example) is a span of the glyph 214 defined by the bounding box 1218 along this dimension 1222.

The glyph size 1220 is then used to determine the font-size adjustment 220. Similar to FIG. 6, "f" represents a font size (i.e., the first font size 216) and "$w_i$" represents the glyph size 522 determined as a width of the bounding box 1218, e.g., a span along a horizontal dimension. Therefore, a font-size adjustment "$s_i$" is generated as a quotient of a width of the em-box (i.e., between the em-box left and right edges 1214, 1216) divided by the glyph size 1220.

The font-size adjustment 220, like before, is then used to determine a second font size 1224, e.g., by multiplying the first font size 1210 by the font-size adjustment 220. Thus, as illustrated for the third stage 1206 of FIG. 12, capitalized glyph 214 of the font 120 having the second font size 1224 matches a width of the em-box, i.e., between the em-box left and right edges 1214, 1216.

Figure 13:
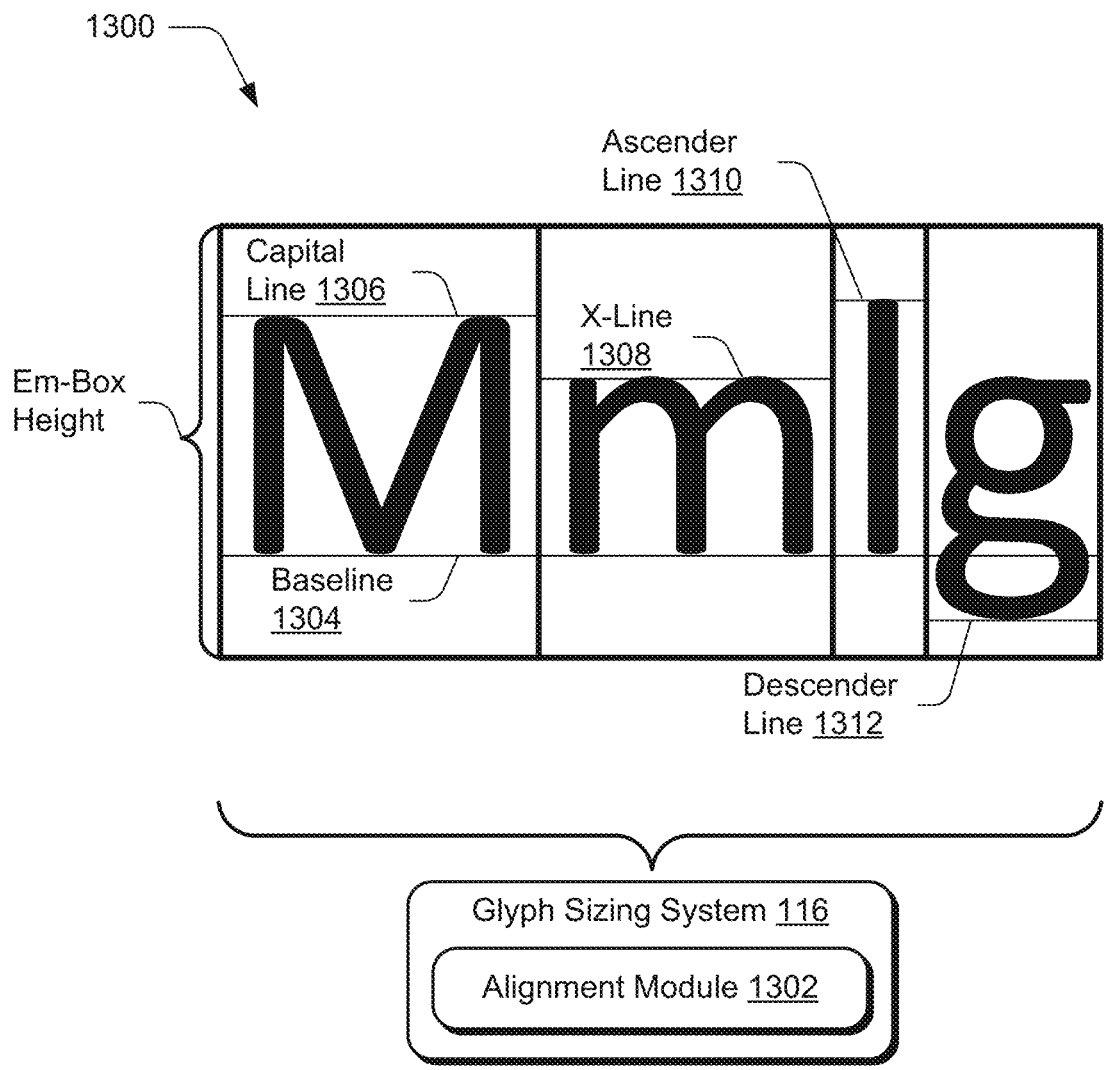
FIG. 13 depicts an example implementation in which a determination of glyph size is used to control a alignment of objects in a user interface.

FIG. 13 depicts an example implementation 1300 in which the determination of glyph size is used to control an alignment behavior of objects in a user interface 110. Conventional alignment techniques for fonts are also based on an em-box. However, as described above an em-box does not have a direct relationship to a size or placement of a glyph within the box.

Therefore, in this example the alignment module 1302 outputs a control 314 that is user selectable to define which parts of a glyph are used to support alignment between a graphic object and a text object based on a particular property, including options such as a baseline 1304, capital line 1306, ascend line 1310, descender line 1312, edges of a bounding box 518, and so forth that are defined in relation to a glyph and not the em-box. The alignment module 1302 then controls placement of an object within the user interface. As a result, the alignment behavior as implemented by the snapping module 1302 has increased accuracy over conventional techniques and improves user efficiency in creating and editing digital content 106.

Example System and Device

Figure 14:
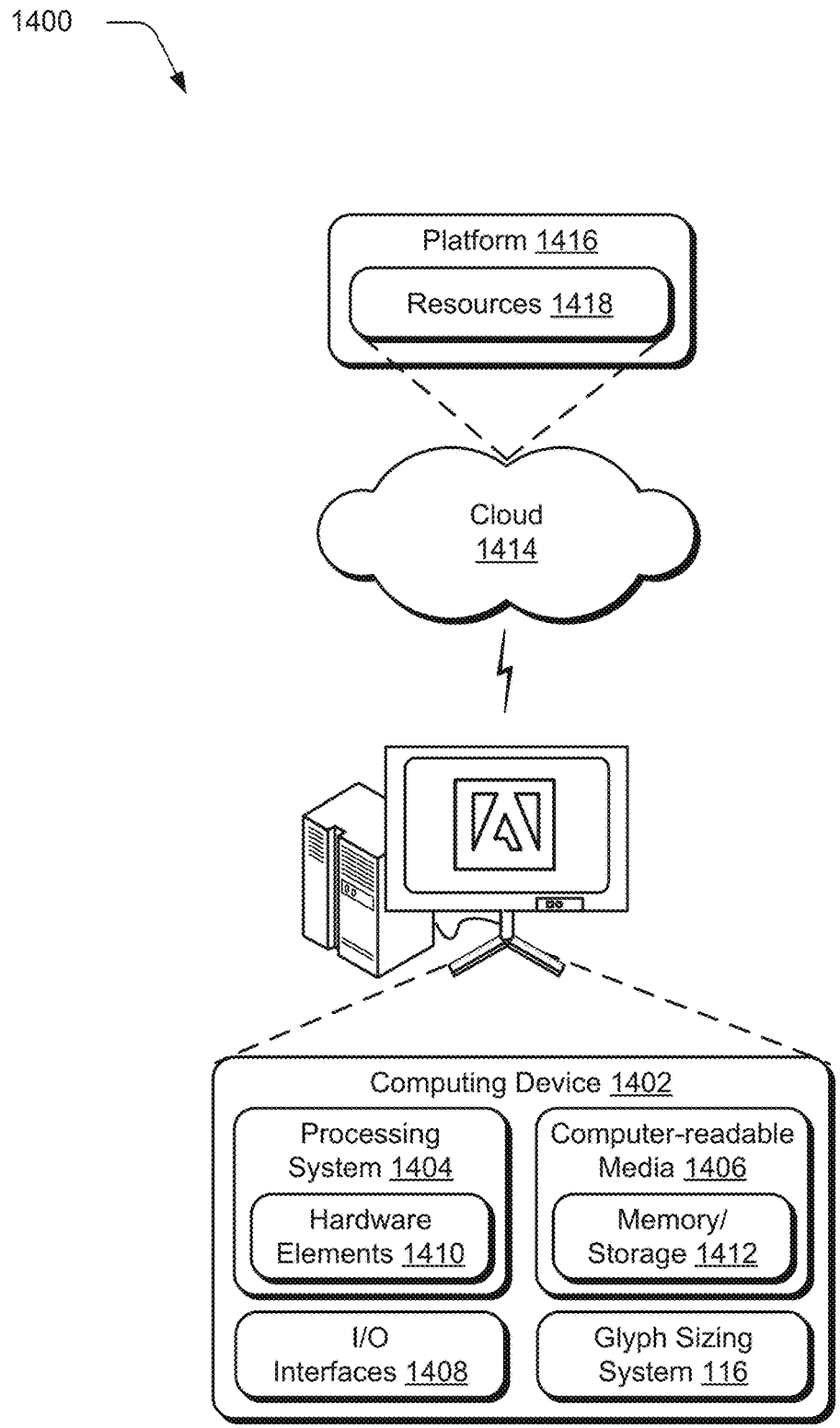
FIG. 14 illustrates an example system including various components of an example device that can be implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that implement the various techniques described herein. This is illustrated through inclusion of the glyph sizing system 116. The computing device 1402 is configurable, for example, as a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that is configurable as processors, functional blocks, and so forth. This includes implementation in hardware as an application specific integrated circuit or other logic device formed using one or more semiconductors. The hardware elements 1410 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1406 is illustrated as including memory/storage 1412. The memory/storage 1412 represents memory/storage capacity associated with one or more computer-readable media. The memory/storage 1412 includes volatile media (such as random access memory (RAM)) and/or nonvolatile media (such as read only memory (ROM), Flash memory, optical disks, magnetic disks, and so forth). The memory/storage 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or nonvisible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1410. The computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supported by various configurations of the computing device 1402 and are not limited to the specific examples of the techniques described herein. This functionality is also implementable all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 abstracts resources and functions to connect the computing device 1402 with other computing devices. The platform 1416 also serves to abstract scaling of resources to provide a corresponding level of scale to encountered demand for the resources 1418 that are implemented via the platform 1416. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:

displaying, by the computing device having a computer-readable storage media, a user interface having a representation of a glyph and a plurality of options of a plurality of units-of-measure, respectively, as dimensions defining a respective dimension of the glyph within an em-box;

receiving, by the computing device having the computer-readable storage media, an input selecting an option of the plurality of options thereby specifying a unit-of-measure corresponding to the option and a dimension corresponding to the option;

determining, by the computing device having the computer-readable storage media, a glyph size of at least one glyph of a font using the unit-of-measure corresponding to the option;

receiving, by the computing device having the computer-readable storage media, an input specifying a particular size of the at least one glyph based on the unit-of-measure corresponding to the option selected by the input;

determining, by the computing device having the computer-readable storage media, a font-size adjustment to resize the at least one glyph based on the input, the font-size adjustment defining an adjustment that is usable to cause a span of the dimension corresponding to the option to coincide with a font size of the font of the at least one glyph, the font-size adjustment defining a correlation between font size as a dimension based on the em-box and the dimension corresponding to the option;

determining, by the computing device having the computer-readable storage media, a font size for the font based on the font-size adjustment, the font size sizing the at least one glyph according to the particular size; and outputting, by the computing device having the computer-readable storage media, the determined font size in the user interface.

2. The method as described in claim 1, wherein the unit-of-measure is based on a width of the font.

3. The method as described in claim 1, further comprising receiving a user input specifying the particular size.

4. The method as described in claim 3, wherein the user input selects an object displayed in a user interface.

5. The method as described in claim 1, wherein the unit-of-measure is based on a capital height of the font.

6. The method as described in claim 1, wherein the unit-of-measure is based on an x-height of the font.

7. The method as described in claim 1, wherein the unit-of-measure is based on an ideographic character space of the font.

8. The method as described in claim 1, wherein the unit-of-measure is dynamic based on a size of text input for rendering in a user interface using the font.

9. The method as described in claim 1, wherein the font-size adjustment is a quotient of the dimension based on the em-box and the dimension corresponding to the option.

10. A system comprising:
a user interface module implemented using a processing device and a computer-readable storage media to receive an input specifying a glyph-size property, the glyph-size property defining a unit-of-measure within an em-box for glyph sizing along a dimension;
an adjustment determination module implemented using the processing device and the computer-readable storage media to determine a font-size adjustment to resize at least one glyph of a font defined using a first font size to comply with the glyph-size property, the font-size adjustment defining an adjustment that is usable to cause a span of the dimension to coincide with a font size of the font of the at least one glyph, the font-size adjustment defining a correlation between font size as a dimension based on the em-box and the dimension corresponding the glyph-size property; and
a font size determination module implemented using the processing device and the computer-readable storage media to determine a second font size in points for the font based on the font-size adjustment, the second font size sizing the at least one glyph according to a particular size that has been selected; and
a user interface module implemented using the processing device and the computer-readable storage media to output the determined font size in points in the user interface.

11. The system as described in claim 10, wherein the unit-of-measure is based on a capital height of the font.

12. The system as described in claim 10, wherein the unit-of-measure is dynamic based on a size of text input for rendering in the user interface using the font.

13. The system as described in claim 10, wherein the unit-of-measure is based on least in part using ascent or descent of the font.

14. The system as described in claim 10, wherein the unit-of-measure is also based on an object rendered in the user interface.

15. The system as described in claim 10, wherein the determination of the font-size adjustment by the adjustment determination module includes:
calculating a bounding box defined using edges of the at least one glyph, the at least one glyph defined using a vector representation;
determining the glyph size as a span of the bounding box along the dimension; and
generating the font-size adjustment as a quotient of the first font size divided by the glyph size.

16. The system as described in claim 15, wherein the second font size is a product of the first font size and the font-size adjustment.

17. The system as described in claim 10, further comprising a rendering module implemented using the processing device and the computer-readable storage media to render text in a user interface using the second font size for the font.

18. One or more computer-readable storage media storing instructions that, responsive to execution by a processing device, causes the processing device to perform operations comprising:
displaying a user interface having a representation of a glyph and a plurality of options of a plurality of units-of-measure, respectively, as dimensions defining a respective dimension of the glyph within an em-box, that are user selectable to control alignment behavior of graphical objects to respective locations of the glyph;
receiving a user input selecting an option of the plurality of options thereby specifying a unit-of measure corresponding to the option and a dimension corresponding to the option; and
controlling placement of the graphical object within the user interface such that the graphical object is aligned, automatically and without user intervention, to the respective said location based upon a font-size adjustment, the font-size adjustment defining an adjustment that is usable to cause a span of the dimension to coincide with a font size of the font of the glyph, the font-size adjustment defining a correlation between font size as a dimension based on the em-box and the dimension corresponding to the option.

19. The method as described in claim 1 wherein the span of the dimension corresponding to the option is determined from maximum and minimum coordinates for pixels of the at least one glyph along the dimension corresponding to the option.

20. The system as described in claim 10, wherein the font-size adjustment is a quotient of the dimension based on the em-box and the dimension corresponding to the glyph-size property.

\* \* \* \* \*